(12) United States Patent
Song

(10) Patent No.: US 11,299,236 B2
(45) Date of Patent: Apr. 12, 2022

(54) METHOD FOR AUTOMATIC RETRACTION OF PEDALS

(71) Applicant: Yunbo Song, Guangdong (CN)

(72) Inventor: Yunbo Song, Guangdong (CN)

(73) Assignee: Yunbo Song, Guangdong (CN)

( * ) Notice: Subject to any disclaimer, the term of this patent is extended or adjusted under 35 U.S.C. 154(b) by 139 days.

(21) Appl. No.: 16/899,594

(22) Filed: Jun. 12, 2020

(65) Prior Publication Data

US 2020/0307741 A1 Oct. 1, 2020

Related U.S. Application Data

(63) Continuation of application No. PCT/CN2017/116891, filed on Nov. 22, 2018.

(30) Foreign Application Priority Data

Dec. 13, 2017 (CN) .......................... 201711328628.4

(51) Int. Cl.
| | |
|---|---|
| *B62M 3/08* | (2006.01) |
| *B62M 1/36* | (2013.01) |
| *B62K 15/00* | (2006.01) |
| *B62K 3/02* | (2006.01) |

(52) U.S. Cl.
CPC .................. *B62M 3/08* (2013.01); *B62K 3/02* (2013.01); *B62M 1/36* (2013.01); *B62K 2015/003* (2013.01); *Y10T 74/2172* (2015.01)

(58) Field of Classification Search
CPC ...................... B62K 2015/003; Y10T 74/2172

USPC ....................................................... 280/281.1
See application file for complete search history.

(56) References Cited

FOREIGN PATENT DOCUMENTS

| | | |
|---|---|---|
| CN | 102092443 A | 6/2011 |
| CN | 206231522 U | 6/2017 |
| CN | 207826440 U | 9/2018 |
| GB | 2241476 A | 9/1991 |

OTHER PUBLICATIONS

International Search Report and (ISA/237) Written Opinion of the International Search Authority for International Patent Application No. PCT/CN2018/116891, issued/mailed by the Japan Patent Office dated Jan. 24, 2019.

*Primary Examiner* — Kevin Hurley
*Assistant Examiner* — Hosam Shabara

(57) ABSTRACT

A method for automatic retraction of a pedal of a bicycle. A first electric actuator is provided on a crank, and the pedal is driven to be retracted by the first electric actuator to complete a first retraction, so that long side of the pedal is changed into a front-rear direction from a left-right direction; a second electric actuator mounted on a bicycle frame drives the crank to idle, and the pedal is gradually straightened in the first retraction process to be parallel with the plane of the bicycle frame to complete a second retraction of the pedal. Using this method, the pedal can be conveniently retracted, and the transverse (left-right) occupying space is minimized, thereby facilitating the automatic storage and saving the storage space.

4 Claims, 3 Drawing Sheets

METHOD FOR AUTOMATIC RETRACTION OF PEDALS

CROSS-REFERENCE TO RELATED APPLICATIONS

This application is a continuation of International Application No. PCT/CN2018/116891 with a filling date of Nov. 22, 2018, designating the United States, now pending, and further claims to the benefit of priority from Chinese Application No. 201711328628.4 with a filing date of Dec. 13, 2017. The content of the aforementioned applications, including any intervening amendments thereto, are incorporated herein by reference.

TECHNICAL FIELD

This application relates to mechatronics, and more specifically to a method for automatic retraction of pedals of a bicycle into a compact and thin structure by improving the pedals of the bicycle (it may also refer to other similar vehicles). The two pedals protruding and occupying a large space are automatically retracted to form a compact and thin structure, thereby, in combination with the automatic retraction of other components of the bicycle, saving the space for receiving the bicycle. Therefore, the present application provides an automatic retraction method to save the storage space for pedals of the bicycle.

BACKGROUND

Bicycle sharing becomes more popular, which facilitates people's life. However, there are many obvious disadvantages, for example, bicycles are misplaced and occupy too much public place, which severely affects the city appearance. A previous disclosure titled "Self-service sharing method for blade-type automatically deformed bicycles" of the present inventor provides a method that enables a bicycle to automatically deform. Using this method, bicycles are uniformly and tidily compressed and stored in warehousing boxes, so that bicycles are available, and all the above-mentioned disadvantages of sharing bicycles are eliminated. During the retraction and deformation of the bicycle, all components extending in a left-right direction (i.e., a direction that is perpendicular to a panel of the bicycle) are changed to extend in a front-rear direction (i.e., a direction that is parallel to a length of the bicycle) or an up-down direction (i.e., a direction that is parallel to a height of the bicycle), so as to save a large amount of storage space. However, the pedals widely extend in the left-right direction, and it is rather complicated to automatically retract the pedals since the pedal rotates in the following two aspects. Firstly, the pedal rotates with the crank to drive the bicycle forward; and secondly, the pedal rotates to ensure the same side of the pedal is always stepped during the repeated circumferential motion.

SUMMARY

Technical Problem

To make bicycles (bicycles herein also refer to electric power assisted electric bicycles, electric bicycles and other similar vehicles) travel more intelligently and conveniently, the present disclosure provides a method for automatically retracting pedals of the bicycle, so as to reduce the space occupied by the pedals and increase the space utilization rate.

Technical Solutions

The present disclosure adopts the following technical solutions. A chargeable battery is mounted on a bicycle frame; power or control signal is transmitted from the bicycle frame to a first electric actuator mounted on the crank to which the pedals are attached through rotation power gaining (electric brush power supply or wireless induction power supply); the first electric actuator drives the pedals to retract in an up-down direction or a left-right direction; a second electric actuator is mounted near a central axle on the bicycle frame which drives the central axle to rotate through a gear or other ways, and then drives a crankset, the crank and the pedals to rotate around the central axle (other solutions to rotate the central axle shall be deemed as equivalent solutions), so that the pedals are retracted to be parallel to the panel of the bicycle frame when the pedals are retracted towards the bicycle frame, and thus a complete retraction of the pedals is completed. A retaining device is arranged at a joint of the pedal and a lower part of the crank, and is configured to maximize a rotation resistance between the pedal and the lower part of the crank when the plane of the pedal is parallel to the plane of the bicycle frame, so that the pedal can only be separated from the bicycle frame under an external force to rotate, for example, the pedals are stepped on by feet.

The implementing principles of the present disclosure are described below.

The chargeable battery is mounted on the bicycle; the crank rotates with the central axle to drive the crankset, and the crankset drives the chain to rotate, and finally the chain drives the wheel to rotate. When a person steps the pedals with a large force when riding a bicycle, the pedal rotates with the central axle, since the pedal is connected to the crankset, the crankset is connected to the crank, and the crank is connected to central axle. During cycling, the plane of the pedal is always perpendicular to the plane of the crankset (i.e., the plane of the bicycle frame). To retract the pedal (the purpose of retraction is to minimize the space occupying by the pedal of the bicycle in the left-right direction, to facilitate automatic storage and save storage space), the plane of the pedal must be changed to a position parallel to the plane of the crankset (i.e. the plane of the bicycle frame) when the bicycle is not in use and maintain this position while going into or out of the specified box for the bicycle to minimize storage space; the pedal needs a first electric actuator (the first electric actuator usually refers to an electric motor, and the principle of other electric actuators is the same as that of the electric motor) to drive the retraction. Electricity is needed for the operation of the motor, and however the panel rotates relative to the bicycle frame, so it is impossible to directly gain electricity from the bicycle frame through wires, and the power is applied to the second electric actuator provided on the crank from the bicycle frame by rotation power gaining. There are many ways for rotation power gaining, which mainly include electric brush rotation power supply or wireless charging power supply. The principle of the electric brush rotation power supply is described as follows. A copper ring is placed on the central axle; the central axle is placed in a bearing for rotation; and a bearing shell is fixed on the bicycle frame. The central axle rotates in the bearing shell, and an electric brush is arranged on the bearing shell. The electric brush is elastically pressed against the copper ring on the central axle, and the electric brush transmits the electricity to the central axle through elastic contact when the central axle rotates. The central axle and the crank are fixedly connected, and thus the second electric actuator on the crank obtains electricity. For the wireless charging power supply, it is non-contact power supply, so the rotation of the panel does not affect the power supply mode thereof (it only needs to ensure that respective coils are corresponding). After the second electric actuator on the crank obtains the power supply, the control signal of the second electric actuator, such as electric motors or electric magnets, is induced through the electric brush or wireless communication.

When the pedal is required to be retracted, the first electric actuator drives the pedal to retract (in the up-down direction or the left-right direction). As the plane of the pedal also rotates around the joint of the pedal and the lower part of the crank, the plane of the pedal may not always be kept in the direction parallel to the plane of the bicycle frame. When the pedal is retracted towards the bicycle frame after one up-down or left-right retraction of the pedal, the width of the pedal may exceed the distance between the crank to which the pedal is attached and the bicycle frame, which may result in an incomplete retraction since the retraction is blocked by the width of the pedal. Therefore, a second retraction is needed for the pedal. The second electric motor is installed near the central axle of the bicycle frame and drives the central axle to rotate through the gear or other ways; when the pedal is retracted towards the bicycle frame, due to the idling rotation (i.e., the wheel is not driven to rotate) of the central axle driven by the second electric motor, the rotation of the central axle drives the crankset and the crank to rotate around the central axle when the pedal gradually is retracted towards the bicycle frame; therefore, the pedal plane is gradually straightened to be parallel to the plane of the bicycle frame to complete a complete retraction of the pedal, i.e., the second retraction. Since the regular pedal cannot always be kept on a plane parallel to the bicycle frame (because the pedal plane is rotatable), the retaining device is mounted at a joint of the pedal and the lower part of the crank to keep the plane of the pedal always on the plane parallel to the bicycle frame (to minimize the occupying space) when the pedal finishes a complete retraction (i.e. after the first retraction and the second retraction). The retaining device maximizes the rotation resistance between the pedal and the lower part of the crank when the plane of the pedal is parallel to the plane of the bicycle frame. This retaining device adopts a non-fixed connection mode, such as a magnetic force, ball screws, which not only ensures the plane of the pedal is constantly kept in the direction parallel to the bicycle frame during the complete retraction, but also the plane of pedal rotates freely under a foot stepping force during normal cycling.

Beneficial Effects

The beneficial effects of the present disclosure are as follows. A method is provided to automatically and conveniently retract the pedals, which occupies minimum transverse (left-right) space, and thus facilitates automatic storage and saves a large amount of storage space (a regular parking spot can accommodate over one hundred such bicycles). The retracted bicycle can be neatly and automatically stored in the specified box, so the method of the present disclosure brings good economic benefits and usage convenience. More importantly, together with other related inventions of the present inventor, it overcomes the problems of the large occupying space and undesirable city appearance caused by the sharing bicycles.

BRIEF DESCRIPTION OF THE DRAWINGS

The present disclosure is further illustrated below with reference to the drawings and embodiments.

Figure 1:
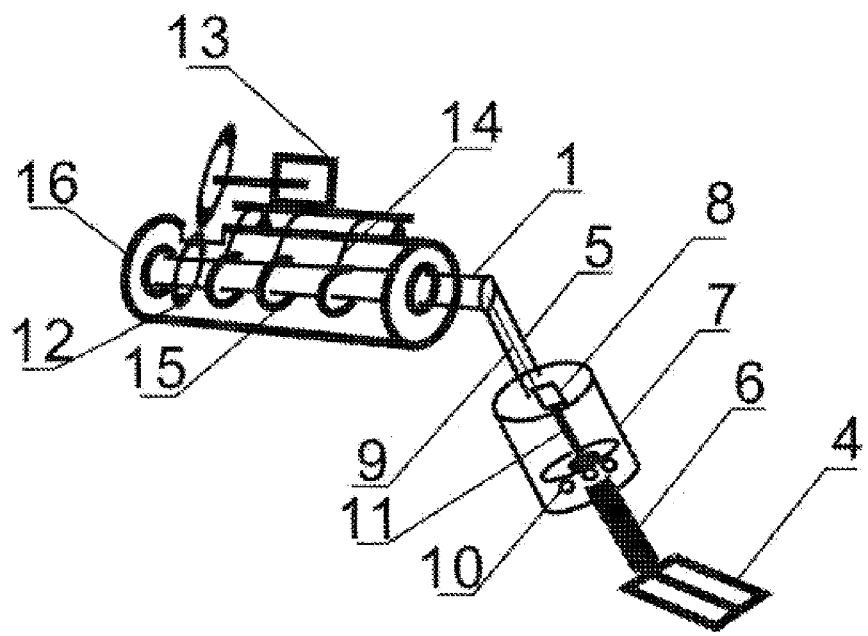
FIG. 1 schematically shows the automatic retraction of pedals according to an embodiment of the present invention.
Figure 2:
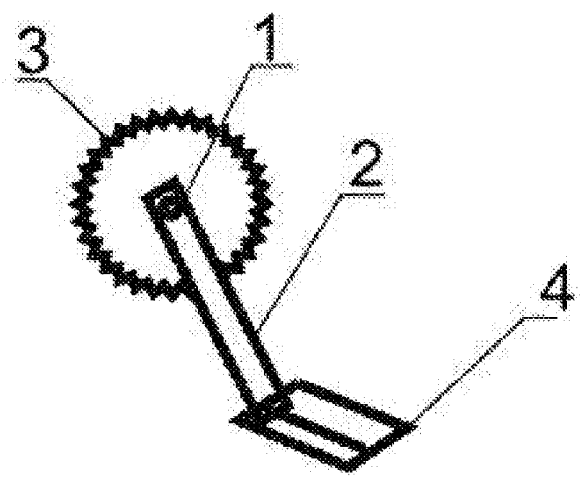
FIG. 2 is a schematic diagram of a pedal of a regular bicycle.

In the drawings: 1, central axle; 2, crank; 3, crankset; 4, pedal; 5, upper part of crank; 6, lower part of crank; 7, movable joint; 8, first electric actuator; 9, power/signal wire; 10, ball; 11, transmission shaft; 12, gear; 13, second electric actuator; 14, electric brush; 15, copper ring; 16, bearing; 17, retaining device.

PREFERRED EMBODIMENT OF THE INVENTION

In an embodiment shown in FIG. 1, considering both the cost and the reliability, a rotating electric brush contact mode is adopted to transmit the power signal and the control signal to the crank. Positive and negative electric brushes are designated for the power signal, and only one electric brush is designated for the control signal. A single chip microcontroller is installed on the crank to receive control signal and control the first electric actuator. The first electric actuator in this embodiment is a micro DC gear motor which has a small size and a large torque and is capable of driving the crank and the pedal to rotate. In this embodiment, the strategy for retracting the pedal is to change an extending direction of the pedal from a left-right direction (i.e., a direction that is perpendicular to a plane of the bicycle) to a front-rear direction (i.e., a direction that is parallel to a length of the bicycle). Such strategy is realized by dividing the crank into an upper part fixed on the central axle and a lower part which is rotatable. The upper part is installed with the first electric actuator, and the rotation of the first electric actuator drives the lower part of the crank to change the direction of the pedal from the left-right direction to the front-rear direction. After the rotation, the direction of the pedal changes from the left-right direction to the front-rear direction, i.e., left-right retraction; an up-down retraction is to change the direction of the pedal from the left-right direction to the up-down direction, which can be realized by steel wire drawing mode; and the direction of the pedal is a length direction of the plane of the pedal.

Figure 3:
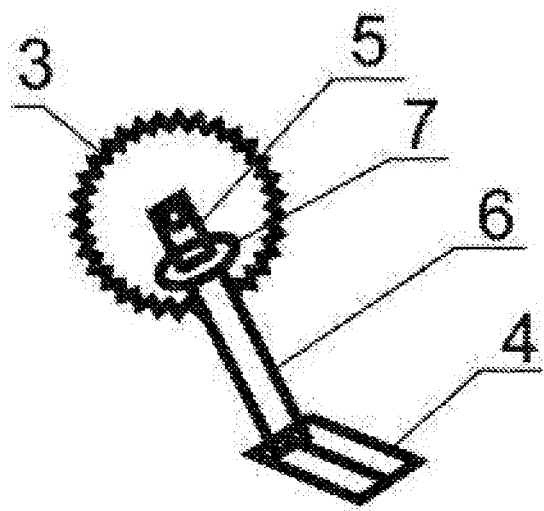
FIG. 3 is a schematic diagram of the pedal of the present invention, in which the pedal is not retracted.
Figure 4:
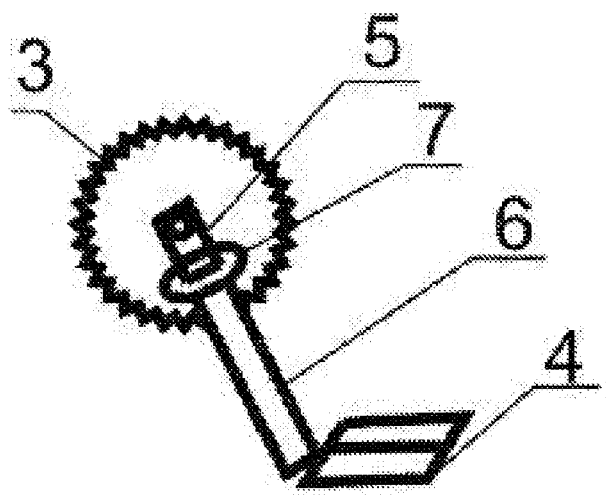
FIG. 4 is a schematic diagram of the pedal of the present invention, in which the pedal is in a retracting process.

The first retraction of the pedal adopts a retraction strategy of changing direction from the left-right direction to the front-rear direction, i.e., the extending direction of the pedal is rotated from the left-right direction (as shown in FIG. 3) during the normal cycling to the front-rear direction (as shown in FIG. 4). The crank 2 is divided into upper and lower parts; the upper part 5 of the crank is fixed on the central axle 1 and is installed with a movable joint 7; the movable joint 7 can rotate on the ball 10 around a transmission shaft 11 of the first electric actuator 8 under the control of the first electric actuator 8, i.e., the micro DC gear motor installed on the crank 2; the power/signal wire 9 of the first electric actuator 8 of the crank is introduced from the chargeable battery on the bicycle frame through the copper ring 15 on the central axle 1 and then through the electric brush 14; the pedal 4 is mounted and attached under the lower part 6 of crank. During the normal cycling, the pedal 4 extends in the left-right direction, which is convenient for the stepping of the left and right feet; when the riding is over, the moveable joint 7 rotates for 90 degrees under the control of the first electric actuator 8 of the crank, and the pedal 4 is changed to extend in the front-rear direction; because the plane of the pedal 4 is rectangle, the direction of the pedal herein refers to the long-side direction of the pedal. When the pedal 4 is changed from left-right direction (as shown in FIG. 3) to front-rear direction (as shown in FIG. 4), a first retraction of the pedal 4 is completed.

Figure 5:
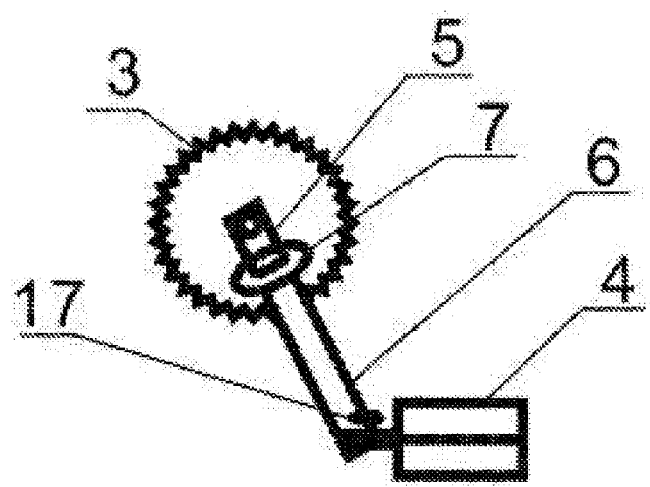
FIG. 5 is a schematic diagram of the pedal of the present invention, in which the pedal is retracted.

When the direction of the pedal 4 is changed from the left-right direction to the front-rear direction, the pedal 4 can not only rotate around the central axle 1 with the crank 2 and the crankset 3, but also the plane of the pedal 4 itself can rotate around the joint of the pedal 4 and the lower part 6 of crank. Therefore, another retraction, i.e., second retraction is required to complete a complete retraction of the pedal 4. The first retraction realizes the retraction of the pedal 4, and the second retraction achieves the retraction of the penal of the pedal 4 (that is, the plane of the pedal 4 is changed to be parallel to the plane of the bicycle frame so as to further reduce the occupying space). The first retraction changes the long-side direction of the pedal 4 from the left-right direction to the front-rear direction, and the second retraction realizes the retraction of the plane of the pedal, i.e., the plane of the pedal 4 is retracted to a direction parallel to the plane of the bicycle frame (the plane of the bicycle frame is the plane of a rear wheel). A second electric actuator 13 of the bicycle frame is mounted near the central axle 1 of the bicycle frame, and drives the central axle 1 to rotate in the bearing 16 of the central axle 1 through the gear 12 or other ways. The rotation of the central axle 1 drives the crankset 3, the crank 2 and the pedal 4 to idle around the central axle, that is, the chain rotates reversely; only the central axle 1 and the crankset 3 rotate; and the wheel does not rotate; the purpose of the idling rotation is to reduce the power of the second electric actuator 13 of the bicycle frame. Therefore, when the pedal 4 is retracted towards the bicycle frame, the plane of the pedal 4 is gradually straightened to be parallel to the plane of the bicycle frame to complete the second retraction, i.e., the complete retraction of the pedal 4 (as shown in FIG. 5).

The bicycle frame in this disclosure are not folded, which aims to keep the two wheels extend in the front-rear direction, so that the bicycle can conveniently and automatically go into or out of the specified box; the transverse stretching components of the bicycle are retracted and thinned to minimize the storage space. After two retractions, the pedals 4 which are one of the components that occupying much space are completely retracted and turned into components which do not occupy extra space, so that the pedals share the storage space with the crank and the bicycle frame, etc.

The retaining device 17 of the pedal plane is installed at the joint of the pedal 4 and the lower part 6 of the crank; the retaining device 17 adopts a magnetic force non-fixed connection mode, i.e., a magnet is installed at the joint of the pedal 4 and the lower part 6 of the crank. When the panel of the pedal 4 is parallel to the plane of the bicycle frame, the pedal 4 is provided with an iron nail at the corresponding position of this magnet, and the iron nail is the most close to the magnet; therefore, under the attraction of magnetic force, the pedal 4 will not depart from the position parallel to the bicycle frame without an external force. However, this electromagnetic force is very small, and the retaining device is free to rotate when a person puts his or her feet on the pedal during normal riding. That is, the retaining device not only can ensure that the plane of the pedal is stably and constantly kept in the direction parallel to the plane of the bicycle frame when the pedal 4 finishes a complete retraction, but also can rotate freely under the stepping force of the feet during normal riding. When the plane of the pedal 4 is parallel to the plane of the bicycle frame, the retaining device 17 maximizes the rotation resistance between the pedal 4 and the lower part 6 of the crank, so that the plane of the pedal 4 can only separate from the bicycle frame under an external force (such as stepping on) to rotate.

The necessities of the present disclosure were described in Chinese Patent Application No. 201611113937.5, titled "Self-service sharing method for blade type automatically deformed bicycles" made by the present inventor. In the interest of saving space, the necessities are not repeatedly described herein, which can be referred to in the above-mentioned disclosure. During the second retraction of the pedal in the present disclosure, i.e., the rotation of the central axle drives the pedal to rotate around the central axle, as the pedal has already finished the first retraction (because the pedal is rotatable), the pedal will be straightened to be straightforward (i.e., the second retraction, as shown in FIG. 5) by the bicycle frame or other protruding components on the bicycle frame (these protruding components can be designed into a slope shape and added with some balls to reduce resistance) as the pedal rotates around the central axis, which can be understood when it is imagined three-dimensionally or by standing beside the bicycle.

INDUSTRIAL APPLICABILITY

All the components of the present disclosure can be manufactured in industrial mass production, and are easy to assemble. Therefore, the present disclosure has high industrial applicability.

What is claimed is:

1. A method for automatic retraction of a pedal, comprising a bicycle comprising a bicycle frame, a crank, a central axle, a crankset and the pedal; wherein a first electric actuator is provided on a crank, and the pedal is driven by the first electric actuator to retract; a second electric actuator is mounted near a central axle of the bicycle frame and drives the central axle to rotate, and then the central axle drives a crankset, the crank and the pedal to rotate around the central axle, so that when the pedal is retracted towards the bicycle frame, a plane of the pedal is gradually straightened to be parallel to a plane of the bicycle frame to complete a complete retraction of the pedal.

2. The method of claim 1, wherein power is transmitted from the bicycle frame to the first electric actuator provided on the crank to which the pedal is attached through rotation power gaining.

3. The method of claim 2, wherein the crank comprises an upper part and a lower part; the upper part is fixed on the central axle, and the lower part is rotatable; the lower part of the crank is rotated to change a direction of the pedal from a left-right direction to a front-rear direction.

4. The method of claim 3, wherein a retaining device is arranged at a joint of the pedal and the lower part of the crank, and maximizes a rotation resistance between the pedal and the lower part of the crank when the plane of the pedal is parallel to the plane of the bicycle frame, so that the pedal is only separated from the bicycle frame to rotate under an external force.

* * * * *